United States Patent [19]

Duez et al.

[11] Patent Number: 5,045,598

[45] Date of Patent: Sep. 3, 1991

[54] SLIT FILM YARN BASED ON PROPYLENE POLYMER AND ITS USE FOR THE MANUFACTURE OF SYNTHETIC LAWN

[75] Inventors: Jean Duez; Daniel Van Houcke, both of Brussels, Belgium

[73] Assignee: Solvay & Cie (Soci/ té Anonyme), Brussels, Belgium

[21] Appl. No.: 407,450

[22] Filed: Sep. 14, 1989

[30] Foreign Application Priority Data

Sep. 16, 1988 [BE] Belgium .............................. 08801069

[51] Int. Cl.⁵ ...................... C08L 53/00; C08F 297/08
[52] U.S. Cl. ...................................... 525/88; 525/323; 524/425; 524/505; 524/536; 428/17; 428/92; 428/97; 264/DIG. 47
[58] Field of Search .................... 525/323, 88; 428/17, 428/97

[56] References Cited

U.S. PATENT DOCUMENTS 4,308,357 12/1981 Kaus et al. ......................... 525/247

FOREIGN PATENT DOCUMENTS 0259940 3/1988 European Pat. Off. .
2011235 2/1970 France .
970479 9/1964 United Kingdom .
2178433 2/1987 United Kingdom .

OTHER PUBLICATIONS

D. C. Allport et al., Block Copolymers, Chapters 4.4 and 4.7, published by Applied Science Publishers, Ltd. London, 1973.

Primary Examiner—Carmen J. Seccuro
Attorney, Agent, or Firm—Spencer & Frank

[57] ABSTRACT

Slit film yarn based on propylene polymer, resistant to postfibrillation. The propylene polymer is a block copolymer of propylene and ethylene made up of chain segments consisting of propylene homopolymer and of chain segments consisting of random copolymer of propylene and ethylene.

This slit film yarn is suitable for the manufacture of synthetic lawn.

10 Claims, No Drawings

SLIT FILM YARN BASED ON PROPYLENE POLYMER AND ITS USE FOR THE MANUFACTURE OF SYNTHETIC LAWN

The present invention relates to slit film yarn based on propylene polymer and resistant to postfibrillation. It also relates to the use of this slit film yarn for the manufacture of synthetic lawn.

It is known to manufacture slit film yarn based on crystalline propylene polymers by slitting films extruded from compositions comprising such polymers. In the majority of the common usages for which this slit film yarn is intended (weaving, rope and string manufacture, etc), the mechanical properties which are imparted to them by the crystalline propylene homopolymers have been found sufficient. For some usages of this slit film yarn, in particular when an exceptional resistance to crushing and/or to tearing is demanded (floor coverings, etc), propylene homopolymers are not, however, wholly satisfactory. For particularly demanding usages of this slit film yarn, such as the manufacture of synthetic lawn, described in European Patent Application EP-A-0,259,940 (Koninklijke Nijverdal-Ten Cate N.V.), a polypropylene such as employed in the examples of this application is not suitable: the strands obtained by mechanical fibrillation of the slit film yarn do not sufficiently withstand crushing and tearing, which give rise to a phenomenon of "postfibrillation" of the slit film yarn after periods of time which are unacceptably short for an article of this type.

The present invention is aimed at providing slit film yarn which does not exhibit these disadvantages.

The present invention relates, therefore, to slit film yarn based on propylene polymer and resisting postfibrillation, the propylene polymer being a block copolymer of propylene and ethylene, made up of chain segments consisting of propylene homopolymer (which are called more briefly "propylene homopolymer" hereinafter) and of chain segments consisting of random copolymer of propylene and ethylene (which are called more briefly "random copolymer" hereinafter).

The block copolymers forming part of the composition of the slit film yarn according to the invention can be manufactured by any known process, in the presence of catalyst systems of the type known as Ziegler-Natta, based on organometallic compounds and on solids containing titanium trichloride. Propylene is generally first polymerized by itself in a first stage and propylene and ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors.

Additional information relating to these block copolymers and to their manufacture may be found particularly in chapters 4.4 and 4.7 of the work "Block Copolymers" edited by D. C. Allport and W. H. Janes, published by Applied Science Publishers Ltd in 1973, which are incorporated by reference in the present description.

The conditions of manufacture of the block copolymers forming part of the composition of the slit film yarn according to the invention are chosen so that these copolymers contain more than 50% by weight of propylene homopolymer, relative to their total weight.

These block copolymers preferably comprise between 60 and 95% by weight of propylene homopolymer and between 40 and 5% by weight of random copolymer. The best results are obtained when these block copolymers comprise between 75 and 90% by weight of propylene homopolymer and between 25 and 10% by weight of random copolymer.

The ethylene content of the random copolymer is such that the weight of ethylene, relative to the total weight of the block copolymer, is between 2 and 20% by weight, preferably between 4 and 15% by weight. The best results are obtained when 5 to 10% of the total weight of the block copolymer consists of ethylene.

The conditions of manufacture of the block copolymers forming part of the composition of the slit film yarn according to the invention are preferably chosen so as to make their average molecular weight, expressed through the melt flow index (MFI), sufficiently high. In general, the MFI (measured at 230° C. under a load of 2.16 kg/cm$^2$ according to ASTM standard D-1238) of these block copolymers is between 0.1 and 10 g/10 min. The MFI is preferably between 0.3 and 3 g/10 min. It has been found that block copolymers of too high MFI produce slit film yarn whose resistance to fibrillation is not sufficient.

In addition to the block copolymers defined above, which form its main constituent (preferably at least 80% by weight), the slit film yarn according to the invention may also contain other polyolefins and conventional ingredients.

Ethylene polymers may be mentioned by way of other polyolefins which can form part of the composition of the slit film yarn. All commercial ethylene polymers can be suitable, such as high-density (above 0.960), medium-density (between 0.930 and 0.960) and low-density (below 0.930) polyethylenes. Linear low-density polyethylenes are preferred because they contribute to improving the abrasion resistance and the flexibility of the slit film yarn.

When present in the slit film yarn according to the invention, these other polyolefins generally constitute 1 to 20% of the total weight, preferably 2 to 15% of the total weight.

The conventional ingredients which can also be incorporated in the slit film yarn include, without any limitation being implied, antioxidants, light stabilizers, processing aids, reinforcing agents, pigments, colorants, fillers, antistatic agents and, especially in the case of the application of the slit film yarn to the manufacture of synthetic lawn, agents lowering the friction coefficient, especially those (polyethylene terephthalate and polytetrafluoroethylene) disclosed in the document EP-A-0,259,940, referred to above, the entire content of which is incorporated by reference in the present application.

These conventional ingredients may be present in the slit film yarn according to the invention in quantities which are generally between 0.01 and 15% by weight, preferably between 0.1 and 10% by weight.

The optional incorporation of the other polyolefins and of the conventional ingredients in the compositions based on block copolymer from which the slit film yarn according to the invention is manufactured can be carried out by any other known process. This incorporation can be carried out, for example, by dry blending, by extruding a mixture of the various constituents, by the conventional masterbatch technique, or the like.

The manufacture of the slit film yarn itself from the compositions described above can also be carried out according to any known methods. It is possible, for example, to manufacture a primary film by extruding the said compositions using so-called "blown film" or "flat die" methods. According to the latter, the film leaving the die is cooled by rolls containing internally circulating fluid (chill roll) or by a water bath. This primary film is then slit into slit film yarn which is drawn before being reeled up.

Alternatively the primary film may be a multi-layer composite obtained by coextrusion so as to obtain a central layer of a composition similar to that described above and one or more surface layer(s) based on the "other polyolefins" also described above.

In the case of the use of this slit film yarn for the manufacture of synthetic lawn, in particular, the yarn may be fibrillated mechanically into finer strands having the appearance of lawn blades and capable of being subjected to any one of the known treatments conferring suppleness, disclosed, for example, in document EP-A-0,259,940.

The production of the synthetic lawn may be carried out conventionally from this slit film yarn, optionally mechanically twined and fibrillated, as already said, by tufting through a synthetic substrate such as a woven or nonwoven cloth, both based on thermoplastic polymer (for example polypropylene).

EXAMPLE 1

An extrudable composition is prepared by incorporating linear low-density polyethylene and calcium carbonate, by the masterbatch method, into a block copolymer of propylene and ethylene, stabilized in a conventional manner. The extrudable composition thus obtained contains:

90% of the block copolymer, which contains 82% by weight of propylene homopolymer and 18% by weight of random copolymer of propylene and ethylene. This block copolymer, whose ethylene content is 7.75% by weight, is marketed by Solvay & Cie under the name Eltex P RF 003 PF and has an MFI of 1.1 g/10 min;

8% by weight of linear low-density polyethylene;

2% by weight of calcium carbonate.

This granulated composition is extruded in the form of a film 95 microns in thickness, cooled by passing through a water bath at a temperature of 37° C., slit into slit film yarn, which is drawn at a draw ratio of approximately 1:4.1 in a drawing oven heated to a temperature of 130° C., and is fibrillated mechanically.

This slit film yarn is tufted through a polypropylene cloth so as to produce a synthetic lawn carpet, samples of which (length: 1.2 m, width: 12 cm) are subjected to a crushing and abrasion test on a Tretrad BMX-B apparatus, according to the DIN draft standard 54322 (1000 cycles). The crushing and tearing (post-fibrillation) resistance is assessed by measuring the proportion (expressed in %) of the initial length of the slit film yarn of the sample which has been torn away.

In the case of the sample of Example 1, only 3.3% of the initial length has been torn away.

This measurement is supplemented by a visual inspection of the sample after the crushing test.

In the case of the sample of Example 1, practically no surface wear can be seen. The slit film yarn of the sample is neither flattened nor postfibrillated.

EXAMPLE 1R

This example is provided by way of comparison.

Example 1 is reproduced, except that the block copolymer is replaced with a homopolymer marketed by Shell under the name Carlona P.

Samples prepared as in Example 1 are subjected to the test described in this example. At the end of this test, 4% of the initial length of the slit film yarn of the sample has been torn away. The slit film yarn of the sample is flattened and postfibrillated.

EXAMPLE 2R

This example is provided by way of comparison.

Example 1 is reproduced, except that the block copolymer is replaced with a random copolymer of propylene and ethylene, containing 1.9% by weight of ethylene.

Samples prepared as in Example 1 are subjected to the test described in this example. At the end of this test 15.5% of the initial length of the slit film yarn of the sample has been torn away. The slit film yarn of the sample exhibits a postfibrillation which is not shown by that according to Example 1.

EXAMPLES 2 AND 3

Example 1 is reproduced with block copolymers which differ slightly from that employed in this example.

The characteristics of the tests and their results are collated in the table below.

TABLE

|  | Example 2 | Example 3 |
|---|---|---|
| Content of the propylene homopolymer in the block copolymer (wt %) | 85 | 79 |
| Ethylene content of the block copolymer (wt %) | 6.5 | 9 |
| MFI of the block copolymer (g/10 min) | 0.65 | 2.5 |
| % of the length torn away | 3.5 | 3.5 |
| Surface state (visual assessment) | no flattening no post-fibrillation | slight post-fibrillation |

We claim:

1. A slit film yarn resistant to postfibrillation, comprising: a block copolymer of propylene and ethylene made up of chain segments consisting of propylene homopolymer and of chain segments consisting of random copolymer of propylene and ethylene.

2. The slit film yarn according to claim 1, wherein the block copolymer comprises between 60 and 95% by weight of propylene homopolymer and 40 to 5% by weight of random copolymer.

3. The slit film yarn according to claim 1, wherein the melt flow index of the block copolymer (230° C.; load; 2.16 kg/cm$^2$) is between 0.1 and 10 g/10 min.

4. The slit film yarn according to claim 1, including linear low density polyethylene.

5. The slit film yarn according to claim 1, including an agent reducing the friction coefficient.

6. Synthetic lawn made from the slit film yarn according to claim 1.

7. The slit film yarn according to claim 2, including linear low density polyethylene.

8. The slit film yarn according to claim 3, including linear low density polyethylene.

9. The slit film yarn according to claim 2, including an agent reducing the friction coefficient.

10. The slit film yarn according to claim 3, including an agent reducing the friction coefficient.

* * * * *